United States Patent [19]
Adachi et al.

[11] Patent Number: 5,606,502
[45] Date of Patent: Feb. 25, 1997

[54] STEERING ANGLE CONTROL SYSTEM FOR VEHICLE

[75] Inventors: Kazutaka Adachi, Yokohama; Hideki Sudo, Tokyo, both of Japan

[73] Assignee: Nissan Motor Co., Ltd., Yokohama, Japan

[21] Appl. No.: 363,037

[22] Filed: Dec. 23, 1994

[30] Foreign Application Priority Data

Dec. 27, 1993 [JP] Japan .................................. 5-332629

[51] Int. Cl.⁶ ..................................................... B62D 5/04
[52] U.S. Cl. .................................. 364/424.045; 180/408; 180/422; 180/446; 180/410
[58] Field of Search ................ 364/424.05; 280/91; 180/79.1, 140, 141, 142, 143

[56] References Cited

U.S. PATENT DOCUMENTS

| | | | |
|---|---|---|---|
| 4,690,431 | 9/1987 | Ito et al. | 280/91 |
| 4,720,790 | 1/1988 | Miki et al. | 364/424.05 |
| 5,267,160 | 11/1993 | Ito et al. | 364/424.05 |
| 5,274,555 | 12/1993 | Fukunaga et al. | 364/424.05 |
| 5,285,390 | 2/1994 | Haseda et al. | 364/424.05 |
| 5,448,481 | 9/1995 | Asanuma et al. | 364/424.05 |
| 5,502,639 | 3/1996 | Fukunaga et al. | 364/424.05 |

FOREIGN PATENT DOCUMENTS

60-229873  11/1985  Japan .
61-67670   4/1986   Japan .

*Primary Examiner*—Gary Chin
*Attorney, Agent, or Firm*—Lowe, Price, LeBlanc & Becker

[57] ABSTRACT

In a steering angle control system including a feed-forward control for producing a desired vehicle motion variable and a feedback control for suppressing disturbances, a controller calculates a corrected steering angle from a detected steering angle and a premeasured characteristic of a steering system. The desired vehicle motion variable is calculated from a vehicle speed and the corrected steering angle. The feedback control is executed according to the difference between the desired and detected vehicle motion variables. Therefore, a driver can control a vehicle with a smooth control response in spite of a non-linear characteristic of the steering system.

7 Claims, 7 Drawing Sheets

STEERING ANGLE CONTROL SYSTEM FOR VEHICLE

BACKGROUND OF THE INVENTION

The present invention relates to improvements in a steering control system of a wheeled vehicle, and more particularly to a steering control system where a non-linear characteristic of a steering system is treated as a factor in a feedback control.

A Japanese Patent Provisional Publication No. 61-67670 discloses a conventional steering angle control system having a feed-forward compensation section for producing a desired response of a vehicle motion variable and a feedback compensation section for suppressing disturbances.

However, this conventional system has neglected a non-linear characteristic of a steering system which characteristic is that a desired vehicle motion variable is not proportional (linear) to the steering angle of a steering wheel. This non-linear characteristic tends to generate a difference between a desired value and a detected value of a vehicle motion variable even when the vehicle is not influenced by disturbances. This difference functions in the feedback control as if the vehicle is influenced by disturbances, and therefore a driver may feel strange during a turning control.

SUMMARY OF THE INVENTION

It is an object of the present invention to provide an improved steering angle control which provides a suitable steering control by including a characteristic of a steering system as a factor in the steering angle control.

A steering angle control system according to the present invention is for a wheeled vehicle and comprises a front wheel steering angle detecting means for detecting one of a steering wheel angle of a steering wheel and a steer angle of a front wheel and outputting a signal indicative of the steering angle. A vehicle speed detecting means detects a speed of the vehicle. A vehicle motion variable detecting means detects a vehicle motion variable of the vehicle. A steer angle controlled variable determining means determines a controlled variable of a steer angle according to the signal from the front wheel steer angle detecting means and the signal from the vehicle speed detecting means. A steering angle correcting means corrects the signal from the front wheel steering angle detecting means according to a preset map indicative of a characteristic of a steering system including the steering wheel. A desired vehicle motion variable calculating means calculates a desired value of the vehicle motion variable according to the corrected steering angle and the vehicle speed. An auxiliary steer angle controlled variable determining means determines an auxiliary controlled variable of the steer angle controlled variable according to a difference between the desired vehicle motion variable and the detected vehicle motion variable. A steer angle controlled variable correcting means corrects the steer angle controlled variable by adding the auxiliary steer angle controlled variable to the steer angle controlled variable. An actual steer angle controlling means controls a steer angle of a wheel to be controlled upon receiving the corrected steer angle controlled variable.

DETAILED DESCRIPTION OF THE INVENTION

Referring to FIGS. 1 to 5, there is shown a first embodiment of a steering angle control system for a four-wheel steer vehicle according to the present invention. The steering angle control system comprises a rear wheel steer angle actuator (or an actual steer angle control device) 6, a controller 7, a steering angle sensor 8, a vehicle speed sensor 9 and a yaw rate sensor (or a yaw angular velocity sensor) 10.

Figure 1:
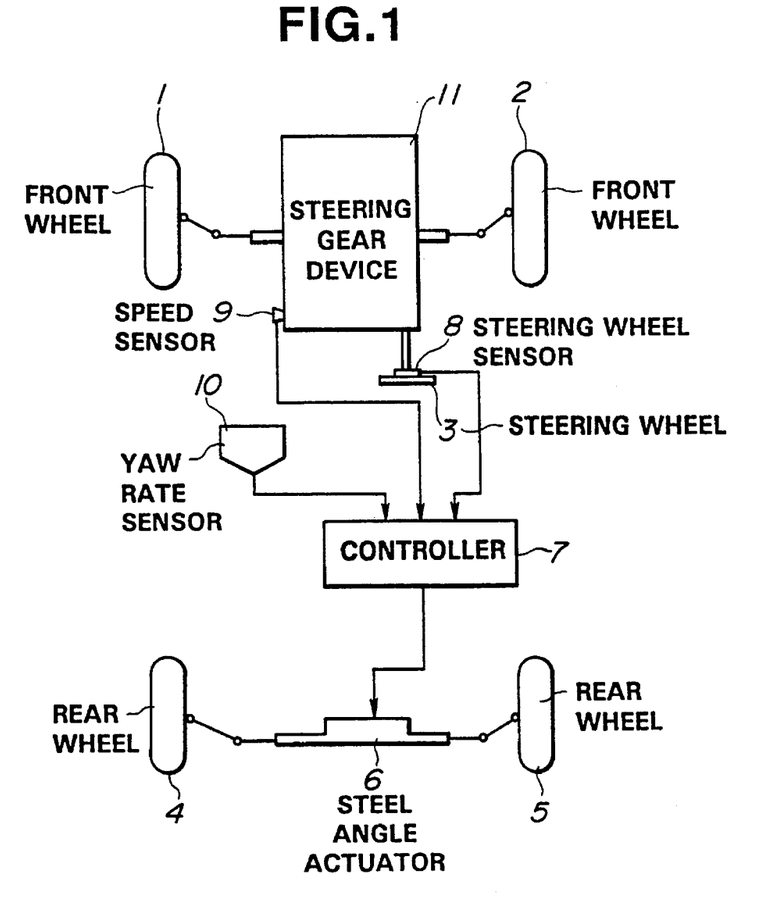
FIG. 1 is a schematic view of a four-wheel steer vehicle which employs a first embodiment of a steering angle control system according the present invention.

As shown in FIG. 1, a steering wheel 3 is connected with front wheels 1 and 2 of the vehicle through a front steering gear device 11. The front steering gear device 11 includes a mechanical front steering linkage for transmitting mechanical motion (or a mechanical steering signal) from the steering wheel 3 to the front wheels 1 and 2. That is, the steering gear device 11 is arranged to steer the front wheels 1 and 2 in accordance with the steering angle of the steering wheel 1. The front wheels 1 and 2 are connected with an engine unit including a transmission unit. The steering angle sensor 8 senses a steering angle $\theta$ and produces a signal indicative of the steering angle $\theta$. The vehicle speed sensor 9 senses a vehicle speed V and produces a signal indicative of the vehicle speed V of the vehicle. The yaw rate sensor 10 senses a yaw rate $d_{\psi S}$ and produces a signal indicative of the yaw rate $d_{\psi S}$.

The controller 7 is constituted by a micro-computer or electrical circuits. The controller 7 receives the signal indicative of the steering angle $\theta$ from the steering angle sensor 8, the signal indicative of the vehicle speed V from the vehicle speed sensor 9, and the signal indicative of a yaw rate $d_{\psi S}$ from the yaw rate sensor 10. The controller 7 executes predetermined calculating operations for obtaining a desired auxiliary steer angle $\delta_R^{\#}$ by which the rear wheels 4 and 5 are controlled through the rear wheel steer angle actuator 6. Then, the controller 7 outputs a drive command to the rear wheel steer angle actuator 6 so as to set the steer angle of the rear wheels 3 and 4 to the desired value.

Figure 2:
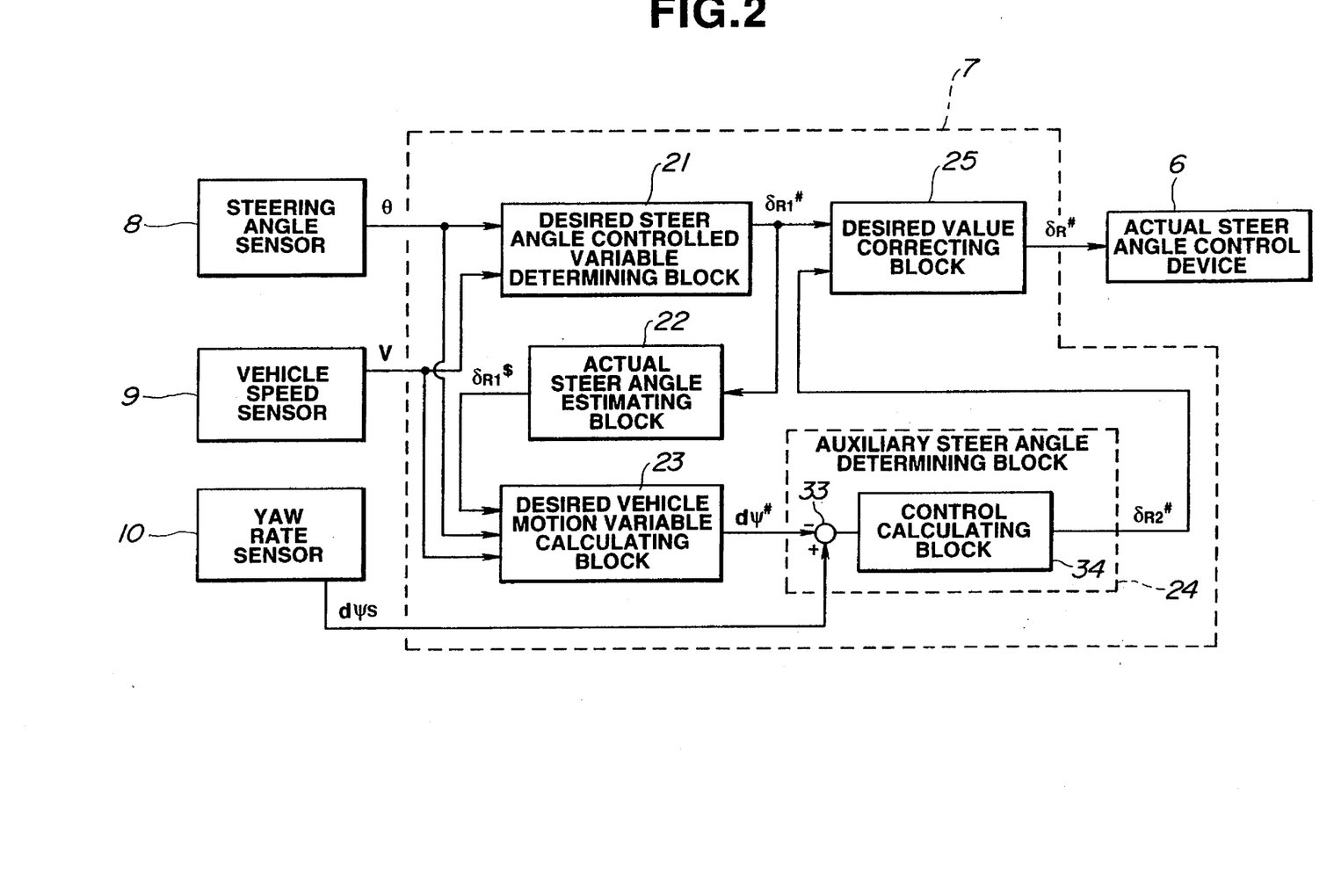
FIG. 2 is a block diagram of a controller of the first embodiment.
Figure 3:
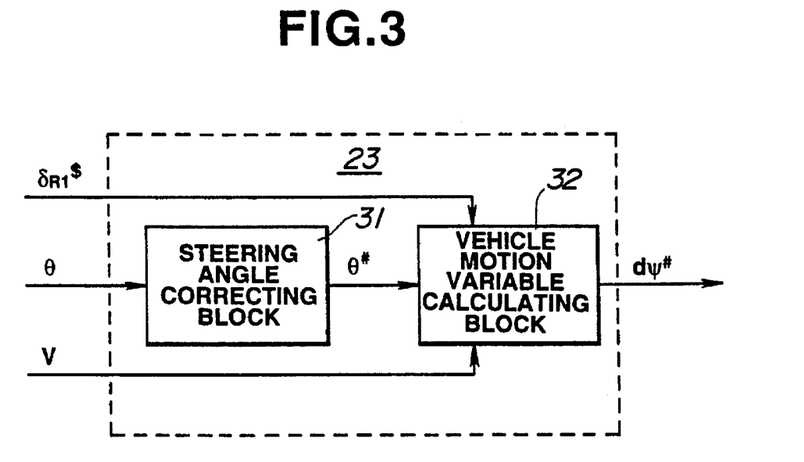
FIG. 3 is a detailed block diagram of a desired vehicle motion variable calculating block in the controller.

As shown in FIG. 2, the controller 7 of the first embodiment comprises a desired steer angle controlled variable determining block 21, an actual steer angle estimating block 22, a desired vehicle motion variable calculating block 23, an auxiliary steer angle determining block 24, and a desired value correcting block 25. The auxiliary steer angle determining block 24 includes a comparator 33 and a control calculating block 34. As shown in FIG. 3, the desired vehicle motion variable calculating block 23 includes a steering angle correcting block 31 and a vehicle motion variable calculating block 32.

Figure 4:
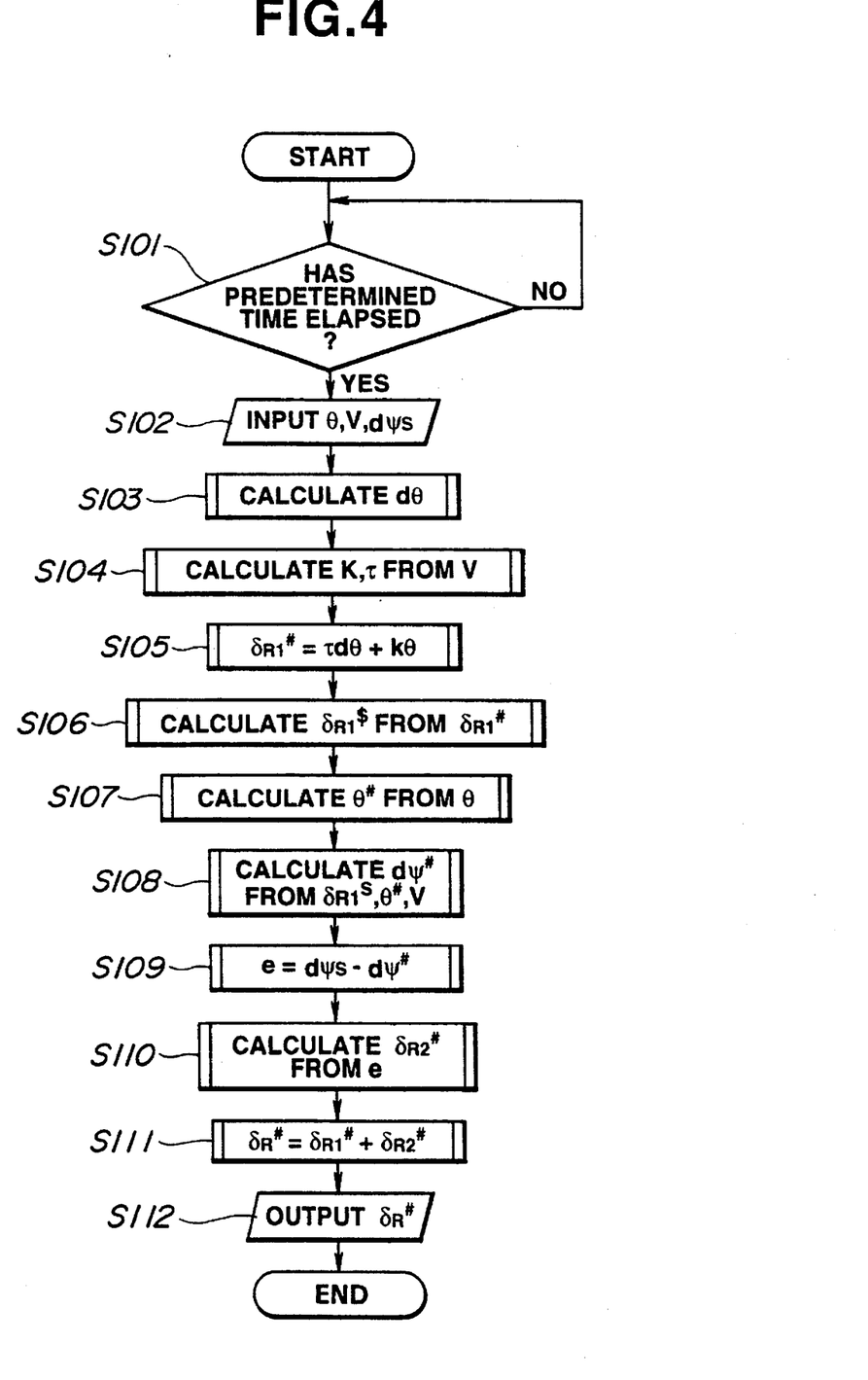
FIG. 4 is a flowchart which shows a control of the rear wheels executed by the controller.

The manner of operation of the rear wheel steer angle control will be discussed hereinafter with reference to a flowchart of FIG. 4.

The controller 7 repeatedly executes the rear wheel steer angle control according to the following steps.

In a step S101, the controller 7 judges as to whether a predetermined time has elapsed in this step or not. If the answer in the step S101 is "NO", the routine repeats the step S101. If "YES", the routine proceeds to a step S102 wherein the controller 7 receives the signal indicative of the steering angle θ, the signal indicative of the vehicle speed V and the signal indicative of the yaw rate $d_{\psi S}$.

In a step S103, a first derivative dθ of the steering angle θ is calculated.

In a step S104, the controller 7 calculates coefficients τ and k from a predetermined relationship with the vehicle speed V, such as a relationship expressed by the following equations.

$$\tau = C \cdot V/(A \cdot V^2 + B) \tag{1}$$

$$k = (B \cdot V^2 + E)/(A \cdot V^2 + B) \tag{2}$$

where A, B, C, D and E are constants.

In a step S105 a desired rear wheel angle $\delta S_{R1}^{\#}$ is calculated from the following equation (3) by using the above coefficients τ and k.

$$\delta_{R1}^{\#} = \tau \cdot d\theta + k \cdot \theta \tag{3}$$

In a step S106, an estimated rear wheel steer angle $\delta_{R1}^{S}$ is calculated from the desired rear wheel steer angle $\delta_{R1}^{\#}$. This processing is executed in the actual steer angle estimating block 22. The estimated rear wheel steer angle $\delta_{R1}^{S}$ is derived from the following equation (4) of a discrete type equation of motion:

$$d_{R1}^{S} = -b_1 \cdot \delta_{R1}^{\#}(i-1) - b_0 \cdot \delta_{R1}^{\#}(i-2) + a_1 \cdot \delta_{R1}^{S}(i-1) + a_0 \cdot \delta_{R1}^{S}(i-2) \tag{4}$$

where $a_0$, $a_1$, $b_0$ and $b_1$ are constants, i indicates that a value is obtained in a present routine, i–1 indicates that a value was obtained in the last routine, and i–2 indicates that a value was obtained in the before-last routine.

Figure 5:
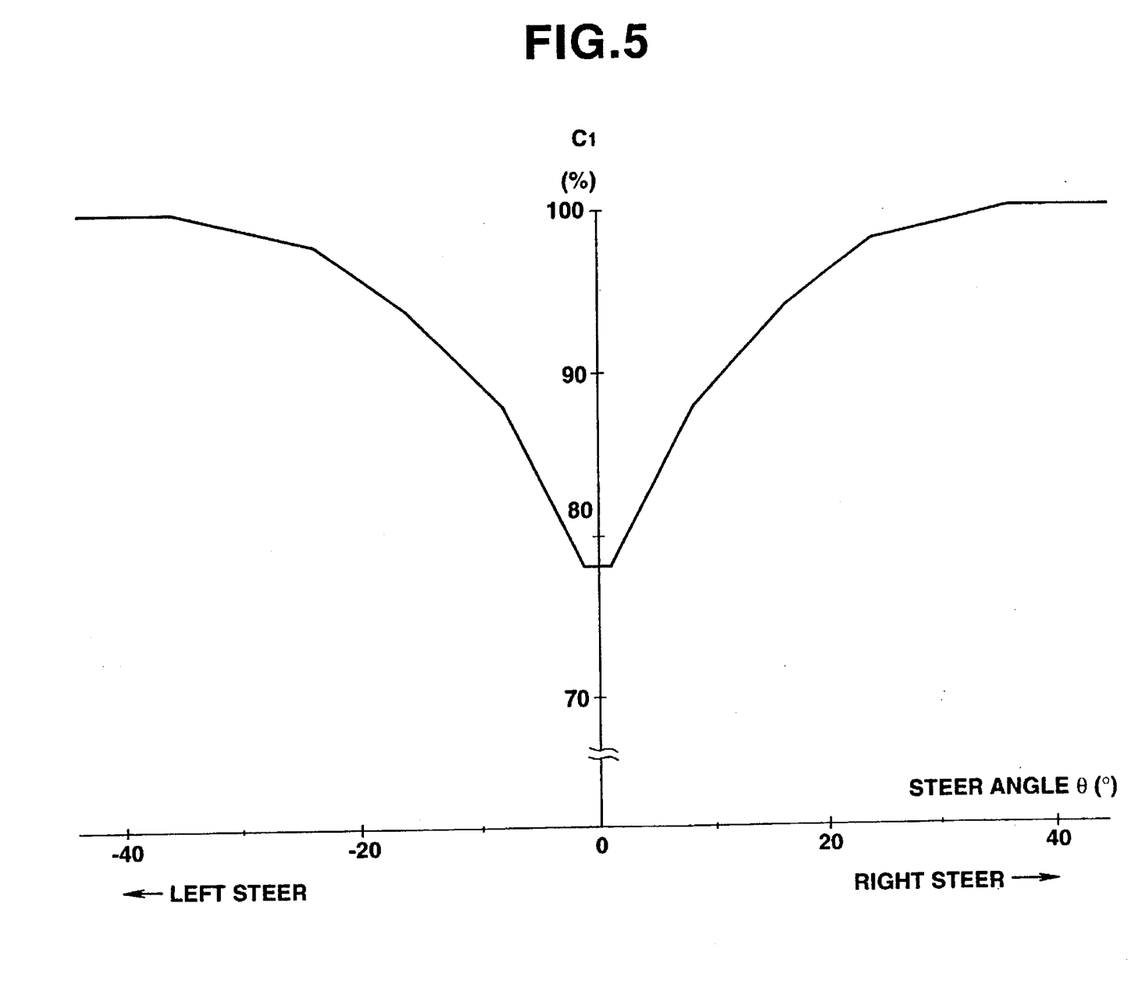
FIG. 5 is a map of a correction coefficient for a corrected steering angle.
Figure 6:
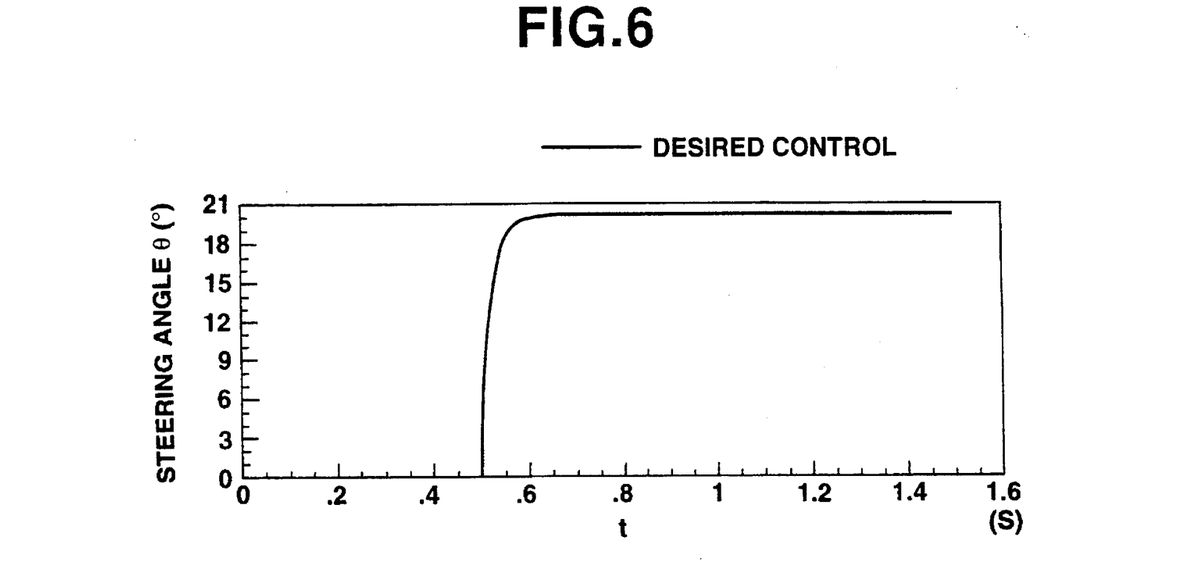
FIG. 6 is a time chart which shows a desired control pattern.
Figure 7:
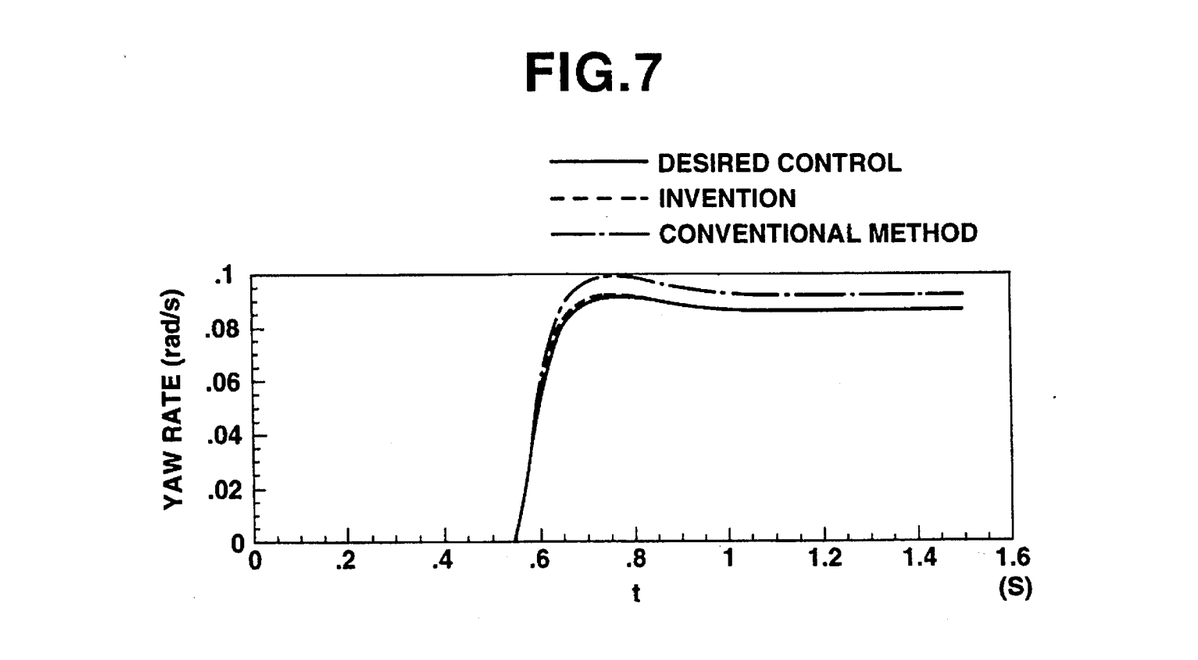
FIG. 7 is a time chart which shows curves of yaw rates obtained by simulations of the control by the present invention and a conventional control.
Figure 8:
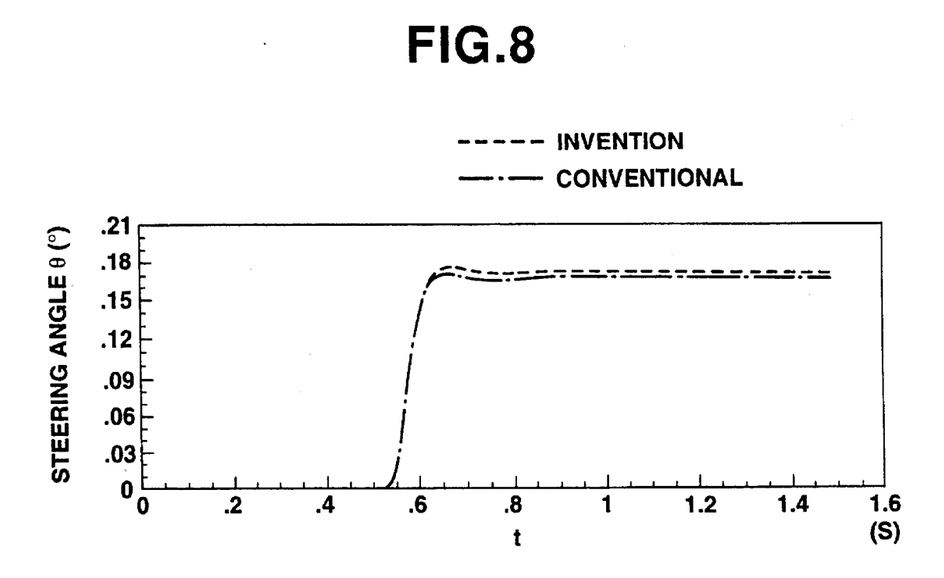
FIG. 8 is a time chart which shows curves of steering angles obtained by simulations of the control by the present invention and a conventional control.
Figure 9:
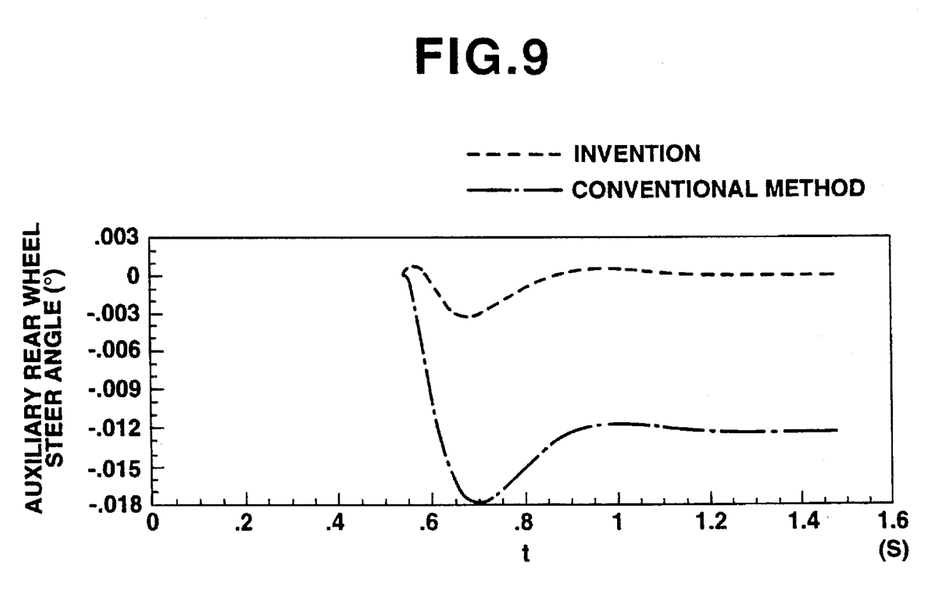
FIG. 9 is a time chart which shows curves of auxiliary rear-wheel steer angles obtained by simulations of the steering angle controls according to the present invention and a conventional control.

In a step S107 the controller 7 receives the steering angle θ and derives a corrected steering angle $\theta^{\#}$ by using a map which shows a relationship between a steering characteristic of the steering system and a correction coefficient. This processing is executed in the steering angle correcting block 31 of the desired vehicle motion variable calculating block 23. The corrected steering angle $\theta^{\#}$ is derived from the following equation (5).

$$\theta^{\#} = C_1 \cdot \theta \tag{5}$$

where $C_1$ is a coefficient shown in the map of FIG. 5 which has been determined from the steering angle θ and the yaw rate $d_{105\ S}$ and which is stored in the controller 7.

In a step S108 the controller 7 calculates the desired yaw rate $d_{\psi}^{\#}$ of a desired vehicle motion variable from the estimated rear wheel steer angle $\delta_{R1}^{S}$, the corrected steering angle $\theta^{\#}$ and the vehicle speed V. This processing is executed in the vehicle motion variable calculating block 32 of the desired vehicle motion variable calculating block 23. The desired yaw rate $d_{\psi}^{\#}$ is derived from the following equations (6) and (7).

$$\begin{bmatrix} d^2\psi^{\#} \\ dV_y^{\#} \end{bmatrix} = \begin{bmatrix} a_{11} & a_{12} \\ a_{21} & a_{22} \end{bmatrix} \begin{bmatrix} d\psi^{\#} \\ V_y^{\#} \end{bmatrix} + \begin{bmatrix} b_{11} & b_{12} \\ b_{21} & b_{22} \end{bmatrix} \begin{bmatrix} d\theta^{\#} \\ \delta_{R1}^{S} \end{bmatrix} \tag{6}$$

$$d\psi^{\#} = [10] \begin{bmatrix} d\psi^{\#} \\ V_y^{\#} \end{bmatrix} \tag{7}$$

where $a_{11} = -2(L_F 2eK_F + L_R 2K_R)/I_Z V$, $a_{12} = -2(L_F eK_F - L_R K_R)/I_Z V$, $a_{21} = -2(L_F eK_F - L_R K_R)/I_Z V$, $a_{22} = -2(eK_F + K_R)/MV$, $b_{11} = 2L_F eK_F/I_Z$, $b_{12} = -2L_R K_F/I_Z$, $b_{21} = 2eK_F/M$, $b_{22} = 2K_F/M$, $L_F$: a distance between a front wheel axis and a center of gravity, $L_R$: a distance between a rear wheel axis and a center of gravity, $I_Z$: a moment of yaw inertia, $eK_F$: a front wheel equivalent cornering power, $K_R$: a rear wheel cornering power, M: a mass of a vehicle, and N: overall steering ratio.

The corrected steering angle $\theta^{\#}$ is used in the calculation of the desired yaw rate $d_{\psi}^{\#}$. This means that the desired yaw rate $d_{\psi}^{\#}$ includes a factor of a non-linear characteristic of a steering system.

In a step S109 a difference e between the detected yaw rate dψS and the desired yaw rate $d_{\psi}^{\#}$ is obtained. This processing is executed by a comparing block 33 in the auxiliary steer angle determining block 24.

In a step S110, an auxiliary rear wheel steer angle (auxiliary controlled variable) $\delta_{R2}^{\#}$ is determined according to the difference e. This processing is executed in the control calculating block 34 of the auxiliary steer angle determining block 24. The control calculating block 34 is constituted by at least one of a proportional control and an integral control.

In a step S111, the correction of the desired rear wheel steering angle $\delta_{R1}^{\#}$ is executed by adding the auxiliary rear wheel steer angle $\delta_{R2}^{\#}$ to the desired rear wheel steer angle $\delta_{R1}^{\#}$.

In a step S112, the controller 7 sends the signal indicative of the corrected desired rear wheel steer angle $\delta_{R}^{\#}$ to the rear wheel steer angle actuator 6 so as to set the rear wheel to the corrected desired rear wheel steer angle $\delta_{R}^{\#}$.

These steps S111 and 112 are executed by the desired correcting block 25. Following these steps, the routine returns to a start and repeats this control.

With the thus arranged control, when the vehicle is running normally and is not influenced by disturbances, the signal indicative of the corrected steer angle $\theta^{\#}$ is used in the calculation of the desired yaw rate $d_{\psi}^{\#}$. This means that the desired yaw rate $d_{\psi}^{\#}$ includes a factor due to the non-linear steering characteristic of the steering system. The feed-forward control in the steps S103 to S105 is stable under this condition. Accordingly, the desired yaw rate $d_\psi^\#$ and the desired yaw acceleration $d^2_\psi^\#$ are achieved finely without a delay. This satisfies e=0, that is, $d_\psi^\#=d_{\psi S}$ and $\delta_{R2}^\#=0$. Practically, this control becomes equal to a control which is operated only by a feed-forward control of the desired rear wheel steer angle $\delta_{R1}^\#$ determined at the desired steer angle controlled variable determining block 21.

When the vehicle is running while influenced by disturbances, a feed-forward control in the steps S103 to S105 becomes unstable. Therefore, the feedback control in the steps S106 to S112 is executed. As a result, the difference e between the detected yaw rate $d_{\psi S}$ and the desired yaw rate $d_\psi^\#$ becomes larger than zero (e>0). The auxiliary rear wheel steer angle $\delta_{R2}^\#$ is produced according to the size of the difference e.

FIGS. 6 to 9 show results of frequency response tests which results were obtained by simulations of the method by the present invention and a conventional method. In these simulations, a control according to the present invention where the non-linear characteristic of a steering system is considered and a conventional control where the non-linear characteristic of the steering system is not considered were carried out and compared with a desired control. As shown in FIGS. 6 to 9, the result by the method according to the present invention corresponds closely with the desired vehicle motion variable. On the other hand, the result by the conventional method does not correspond with the desired value. The reason for the discord by the conventional method is that the auxiliary rear wheel steer angle $d_{R2}^\#$ has been calculated according to the characteristic of the steering system although it is necessary to be used.

Conditions for the above simulations were set as follows:
vehicle speed: V=120.0 km/h;
steering angle: θ=20°;
vehicle specification;
vehicle weight: M=1720 kg,
yaw inertia moment: $I_Z$=2646 kgm²,
front wheel equivalent cornering power:
$eK_F$=73040.0 N/rad,
rear wheel cornering power: KR=146760 N/rad,
wheel base: L=2.575 m,
distance between the front wheel axis and the center of gravity: $L_F$=1.213 m,
distance between the rear wheel axis and the center of gravity: $L_R$=1.362 m,
steering gear ratio: N=16.8,
constants in the desired steering angle controlled variable determining block at 120 km/h;
proportion constant: k=0.17,
differential constant: τ=-3.2*10⁻³, specification of an actuator for rear wheel steering;
moment of inertia: $J_{mot}$=6.0*10⁻⁵ kgm²,
coefficient of viscous friction: $D_{mot}$=1.0*10⁻⁴ Nms/rad,
spring constant: $K_{mot}$=3.0*10⁻² Nms/rad,
resistance of armature: $R_{mot}$=0.3 Ω,
inductance of armature: $L_{mot}$=0.3 mH, and
torque constant: $K_{Tmot}$=2.9 Nm/A.

With the thus arranged system, the steering angle correcting block 31 corrects the signal indicative of the steering angle θ to the corrected steering angle θ<sup>#</sup> upon taking the premeasured characteristic of the steering system into consideration. Further, the desired vehicle motion variable calculating block 23 calculates the desired yaw rate $d_\psi^\#$ from the corrected steering angle θ<sup>#</sup> and the vehicle speed V.

Accordingly, the difference between the detected yaw rate $d_{\psi S}$ and the desired yaw rate $d_{\psi S}^\#$ becomes small. This suppresses the influence by the disturbances with respect to the desired yaw rate and therefore is prevented from applying a strange feeling to a driver.

Figure 10:
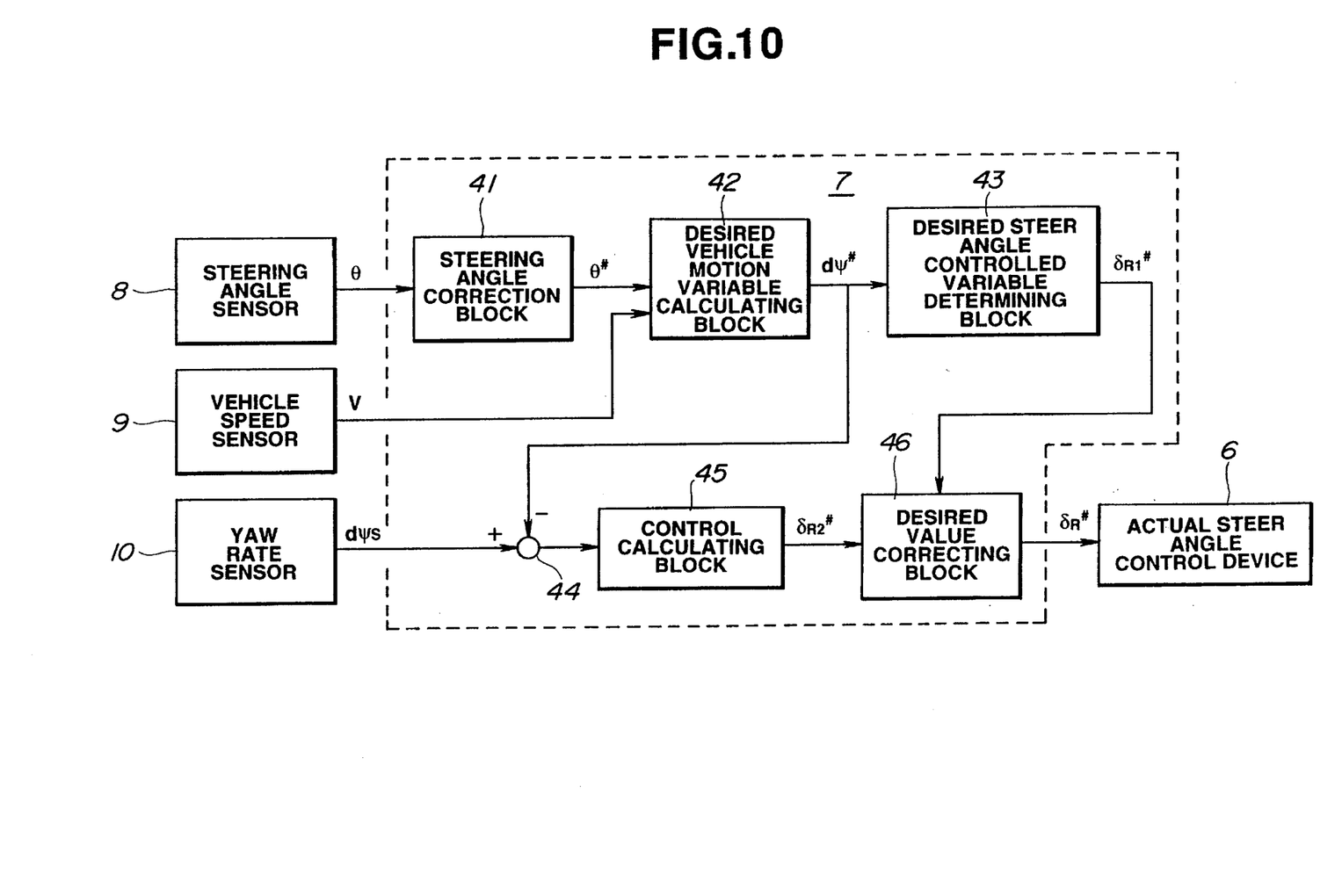
FIG. 10 is a block diagram showing a controller of a second embodiment of the steering control system according to the present invention.

Referring to FIG. 10, there is shown a second embodiment of a steering angle control system according to the present invention. The structure of the second embodiment is similar to that of the first embodiment except for the structure of the controller 7.

As shown in FIG. 10, the controller 7 of the second embodiment comprises a steering angle correcting block 41, a desired vehicle motion variable calculating block 42, a desired steer angle controlled variable determining block 43, a control calculating block 45 and a desired value correcting block 46. The steering angle correcting block 41 receives the signal indicative the steering angle θ and calculates a corrected steering angle θ<sup>#</sup> from the premeasured characteristic of the steering system. The desired vehicle motion variable calculating block 42 is the signal indicative of the corrected steering angle θ<sup>#</sup> and the signal indicative of the vehicle speed V and calculates the desired yaw rate $d_\psi^\#$. The desired steer angle controlled variable determining block 43 receives the desired yaw rate $d_\psi^\#$ and produces the desired rear wheel steer angle $\delta_{R1}^\#$. A comparator 44 receives the detected yaw rate $d_{\psi S}$ and the desired yaw rate $d_\psi^\#$, and outputs a difference e therebetween. A control calculating block 45 decides an auxiliary rear wheel steer angle $\delta_{R2}^\#$ according to the difference e. The desired value correcting block 46 corrects the desired rear wheel steer angle $\delta_{R1}^\#$ by adding the auxiliary rear wheel steer angle $\delta_{R2}^\#$ thereto, and outputs the connected rear wheel steer angle $\delta_R^\#$ to the rear wheel steer angle actuator 6 for steering the rear wheels 4 and 5.

With the thus arranged steering angle control system of the second embodiment, the same function and advantages as in the first embodiment are obtained.

While the preferred embodiments of the present invention have been shown and described with reference to the drawings, it is to be understood that changes and variations may be made without departing from the spirit or scope of the invention.

Although the preferred embodiments of the present invention have been shown and described so that the yaw rate is used as a desired value of a vehicle motion variable for the vehicle, it is to be understood that a desired value of the lateral acceleration, a desired value of a lateral speed or both of them may be used as a desired value of the vehicle motion variable. Furthermore, while the preferred embodiments of the present invention have been shown and described to calculate the desired yaw rate $d_\psi^\#$ by correcting the steering angle signal θ to the corrected steering angle signal θ<sup>#</sup> so as to include a factor of the non-linear characteristic of the steering system, it will be appreciated that such a correction factor may be directly applied to the desired yaw rate.

What is claimed is:

1. A steering angle control system for a vehicle, comprising:

a front wheel steering angle detecting means for detecting one of a steering wheel angle of a steering wheel and a steer angle of a front wheel and outputting a signal indicative of the steering angle;

a vehicle speed detecting means for detecting a speed of the vehicle;

a vehicle motion variable detecting means for detecting a vehicle motion variable of the vehicle;

a steer angle controlled variable determining means for determining a controlled variable of a steer angle according to the signal from said front wheel steer angle detecting means and the signal from said vehicle speed detecting means;

a steering angle correcting means for correcting the signal from said front wheel steering angle detecting means according to a preset map indicative of a characteristic of a steering system including the steering wheel;

a desired vehicle motion variable calculating means for calculating a desired value of the vehicle motion variable according to the corrected steering angle and the vehicle speed;

an auxiliary steer angle controlled variable determining means for determining an auxiliary controlled variable of the steer angle controlled variable according to a difference between the desired vehicle motion variable and the detected vehicle motion variable;

a steer angle controlled variable correcting means for correcting the steer angle controlled variable by adding the auxiliary steer angle controlled variable to the steer angle controlled variable; and an actual steer angle controlling means for controlling a steer angle of a wheel to be controlled upon receiving the corrected steer angle controlled variable.

2. A steering angle control system as claimed in claim 1, wherein said vehicle motion variable detecting means includes a yaw rate sensor.

3. A steering angle control system as claimed in claim 1, wherein said vehicle motion variable detecting means includes a lateral acceleration sensor.

4. A steering angle control system as claimed in claim 1, wherein said steer angle controlled variable determining means determines a controlled variable of a steer angle of rear wheels.

5. A steering angle control system as claimed in claim 1, wherein the auxiliary steer angle controlled variable corresponds to the difference determined by means of at least one of a proportional control and an integral control.

6. A steering angle control system as claimed in claim 1, wherein said actual steer angle controlling means includes a rear wheel steer angle actuator for controlling a steer angle of rear wheels.

7. A steering angle control system for a vehicle, comprising:

a steering angle sensor detecting a steering wheel angle of a steering wheel and outputting a signal indicative of the steering angle;

a vehicle speed sensor detecting a vehicle speed and outputting a signal indicative of the vehicle speed;

a yaw rate sensor detecting a yaw rate generated in the vehicle and outputting a signal indicative of the yaw rate;

a controller receiving the signals from said steering angle sensor, said vehicle speed sensor and said yaw rate sensor, said controller including a map for obtaining a corrected steering angle according to the signal from said steering angle sensor, said controller correcting the detected steering angle from the map and the steering angle, said controller deriving a desired yaw rate from the corrected steering angle and the vehicle speed, said controller deriving a controlled variable of a rear wheel steer angle from the steering angle and the vehicle speed, said controller determining an auxiliary controlled variable for the controlled variable according to a difference between the desired yaw rate and the detected yaw rate, said controller outputting a rear wheel control signal derived by adding the controlled variable and the auxiliary controlled variable; and a rear wheel steer angle actuator receives the rear wheel control signal and sets a steer angle of the rear wheels so that the vehicle generates a yaw rate corresponding to the desired yaw rate.

\* \* \* \* \*